US012799241B2

(12) United States Patent
Konno et al.

(10) Patent No.: US 12,799,241 B2
(45) Date of Patent: Nov. 17, 2026

(54) PHOTOCURABLE COMPOSITION AND PATTERN FORMATION METHOD

(71) Applicant: TOKYO OHKA KOGYO CO., LTD., Kanagawa (JP)

(72) Inventors: Kenri Konno, Kanagawa (JP); Risako Mori, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 147 days.

(21) Appl. No.: 18/550,002

(22) PCT Filed: Mar. 7, 2022

(86) PCT No.: PCT/JP2022/009681

§ 371 (c)(1),
(2) Date: Sep. 11, 2023

(87) PCT Pub. No.: WO2022/196408

PCT Pub. Date: Sep. 22, 2022

(65) Prior Publication Data

US 2024/0166779 A1 May 23, 2024

(30) Foreign Application Priority Data

Mar. 16, 2021 (JP) ................................ 2021-042612

(51) Int. Cl.

| | |
|---|---|
| ***C08F 22/24*** | (2006.01) |
| ***B29C 59/00*** | (2006.01) |
| ***B29C 59/02*** | (2006.01) |
| ***B29K 81/00*** | (2006.01) |
| ***B29K 105/16*** | (2006.01) |
| ***B29K 509/02*** | (2006.01) |
| ***C08F 2/44*** | (2006.01) |
| ***C08F 2/46*** | (2006.01) |
| ***C08K 3/22*** | (2006.01) |

(52) U.S. Cl.

CPC ........... *C08F 22/24* (2013.01); *B29C 59/005* (2013.01); *C08F 2/44* (2013.01); *C08F 2/46* (2013.01); *C08K 3/22* (2013.01); *B29C 59/026* (2013.01); *B29K 2081/00* (2013.01); *B29K 2105/162* (2013.01); *B29K 2509/02* (2013.01); *C08K 2003/2241* (2013.01); *C08K 2003/2244* (2013.01); *C08K 2201/003* (2013.01)

(58) Field of Classification Search

CPC ..... B29C 59/005; B29C 59/026; C08F 22/24; C08F 2/44; C08F 2/46; C08F 2/48; C08K 3/22; C08K 2003/2241; C08K 2003/2244; C08K 2201/003; B29K 2081/00; B29K 2105/162; B29K 2509/02; B29K 2003/2241; B29K 2003/2244; B29K 2201/003; G03F 7/027; G03F 7/0047; G03F 7/002; H01L 21/027

See application file for complete search history.

(56) References Cited

U.S. PATENT DOCUMENTS

| | | | |
|---|---|---|---|
| 2013/0241092 A1 | 9/2013 | Takeuchi et al. | |
| 2022/0325127 A1 | 10/2022 | Chisaka et al. | |

FOREIGN PATENT DOCUMENTS

| | | | | |
|---|---|---|---|---|
| EP | 4 019 558 A1 | | 6/2022 | |
| JP | 2003-318313 A | | 11/2003 | |
| JP | 2004-176006 A | | 6/2004 | |
| JP | 2008105414 A | * | 5/2008 | ............. C08F 16/32 |
| JP | 2009-102550 A | | 5/2009 | |
| JP | 2011-187824 A | | 9/2011 | |
| JP | 2012-216655 A | | 11/2012 | |
| JP | 2013-095833 A | | 5/2013 | |
| JP | 2013-191800 A | | 9/2013 | |
| JP | 2020-132760 A | | 8/2020 | |
| JP | 2021-031669 A | | 3/2021 | |
| WO | 2018/075848 A1 | | 4/2018 | |

OTHER PUBLICATIONS

JP-2008105414-A (Takashi) May 2008 (online machine translation), [Retrieved on Mar. 24, 2025]. Retrieved from: Espacenet (Year: 2008).*

Otsu et al., machine English translation of JP 2009-102550A (Year: 2009).*

* cited by examiner

*Primary Examiner* — Jessica M Roswell

(74) *Attorney, Agent, or Firm* — Rankin, Hill & Clark LLP

(57) ABSTRACT

A photocurable composition including metal oxide nanoparticles (X) and a photopolymerizable sulfur compound (C).

8 Claims, 2 Drawing Sheets

PHOTOCURABLE COMPOSITION AND PATTERN FORMATION METHOD

Priority is claimed on Japanese Patent Application No. 2021-042612, filed on Mar. 16, 2021, the content of which is incorporated herein by reference.

TECHNICAL FIELD

The present invention relates to a photocurable compositions and a pattern formation method.

BACKGROUND ART

A lithography technology is a core technology in the process of manufacturing semiconductor devices, and with the recent increase in the integration of semiconductor integrated circuits (IC), further miniaturization of wiring is progressing. Typical examples of the miniaturization method include shortening the wavelength of a light source using a light source having a shorter wavelength such as a KrF excimer laser, an ArF excimer laser, an $F_2$ laser, extreme ultraviolet light (EUV), an electron beam (EB), or an X-ray, and increasing the diameter (increase in NA) of the numerical aperture (NA) of a lens of an exposure device.

Under the above-described circumstances, nanoimprint lithography, which is a method of pressing a mold having a predetermined pattern against a curable film formed on a substrate so that the pattern of the mold is transferred to the curable film, is expected as a fine pattern formation method for a semiconductor from the viewpoints of the productivity and the like.

In the nanoimprint lithography, a photocurable composition containing a photocurable compound that is cured by light (ultraviolet rays or electron beams) is used. In such a case, a transfer pattern (structure) is obtained by pressing a mold having a predetermined pattern against a curable film containing a photocurable compound, irradiating the curable film with light to cure the photocurable compound, and peeling off the mold from the cured film.

The photocurable composition used for nanoimprint lithography is required to have properties such as coatability in a case where a substrate is coated with the composition through spin coating or the like; and curability in a case where the composition is heated or exposed. In a case where the coatability thereof on the substrate is poor, the film thickness of the photocurable composition applied onto the substrate is uneven, and the pattern transferability is likely to be degraded in a case where the mold is pressed against the curable film. Further, the curability is an important property for maintaining the pattern formed by pressing the mold to have desired dimensions. Further, the photocurable composition is also required to have satisfactory mold releasability in a case where the mold is peeled off from the cured film.

In recent years, it has been examined to apply nanoimprint lithography for enhancing the functionality of 3D sensors for autonomous driving and AR waveguides for AR (augmented reality) glasses. In the 3D sensors and AR glasses, it is required to increase the refractive index of a permanent film material constituting a part of the device.

It is known to add metal oxide nanoparticles as one means for increasing the refractive index of a nanoimprint material. For example, Japanese Unexamined Patent Application, First Publication No. 2013-191800 describes a photocurable resin composition in which a high refractive index is achieved by blending metal oxide nanoparticles such as titanium oxide and zirconium oxide.

Further, as the means for increasing the refractive index of the nanoimprint material, for example, Patent Document 2 describes a photocurable resin composition in which a high refractive index is achieved by using a compound having a biphenyl skeleton and containing a polymerizable group, and a photopolymerization initiator.

CITATION LIST

Patent Documents

[Patent Document 1]

Japanese Unexamined Patent Application, First Publication No. 2013-191800

[Patent Document 2]

Japanese Unexamined Patent Application, First Publication No. 2013-95833

SUMMARY OF INVENTION

Technical Problem

It is considered to increase the content of the metal oxide nanoparticles or increase the particle diameter of the metal oxide nanoparticles to further increase the refractive index of the nanoimprint material. However, there is a problem in that the viscosity of the photocurable resin composition is increased due to addition of an excessive amount of metal oxide nanoparticles and the filling property of the nanoimprint pattern is degraded.

Further, as a result of examination conducted by the present inventors, it was found that in a case where a compound having a biphenyl skeleton and containing a polymerizable group, as described in Patent Document 2, is used, the filling property of the nanoimprint pattern tends to be degraded.

The present invention has been made in consideration of the above-described circumstances, and an object thereof is to provide a photocurable composition with a high refractive index and satisfactory transferability of a fine pattern, and a pattern formation method.

Solution to Problem

In order to solve the above-described problems, the present invention has adopted the following configurations.

That is, according to a first aspect of the present invention, there is provided a photocurable composition including metal oxide nanoparticles (X) and a photopolymerizable sulfur compound (C).

According to a second aspect of the present invention, there is provided a pattern formation method including a step of forming a photocurable film on a substrate using the photocurable composition according to the first aspect, a step of pressing a mold having an uneven pattern against the photocurable film to transfer the uneven pattern to the photocurable film, a step of exposing the photocurable film to which the uneven pattern has been transferred while pressing the mold against the photocurable film to form a cured film, and a step of peeling off the mold from the cured film.

Advantageous Effects of Invention

According to the present invention, it is possible to provide a photocurable composition with a high refractive index and satisfactory transferability of a fine pattern, and a pattern formation method.

DESCRIPTION OF EMBODIMENTS

Figure 1:
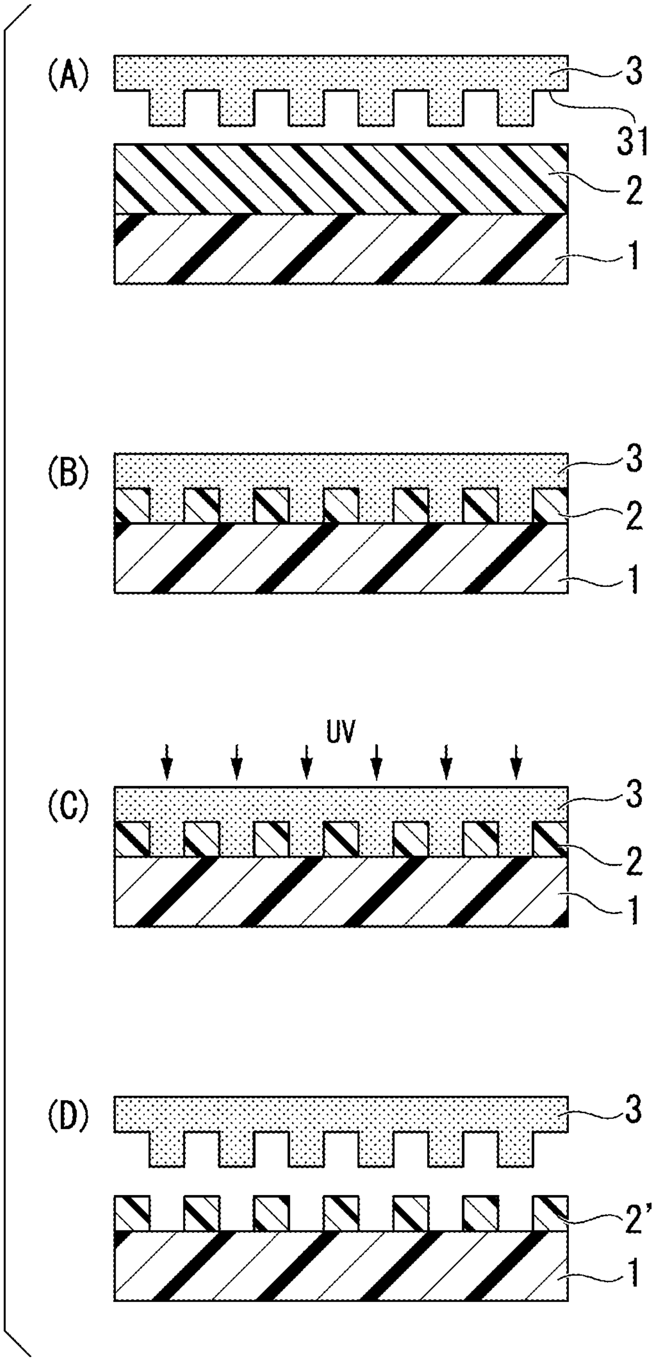
FIGS. 1(A) to 1(D) are schematic step views for describing an embodiment of a nanoimprint pattern formation method.

In the present description and the scope of the present patent claims, the term "aliphatic" is a relative concept used in relation to the term "aromatic", and defines a group, a compound, or the like that has no aromaticity.

The term "alkyl group" includes a linear, branched, or cyclic monovalent saturated hydrocarbon group unless otherwise specified. The same applies to the alkyl group in an alkoxy group.

The "(meth)acrylate" indicates at least one of acrylate and methacrylate.

The expression "may have a substituent" includes both a case where a hydrogen atom (—H) is substituted with a monovalent group and a case where a methylene ($—CH_2—$) group is substituted with a divalent group.

The term "light exposure" is a general concept for irradiation with radiation.

(Photocurable Composition)

A photocurable composition according to a first aspect of the present invention contains metal oxide nanoparticles (X) and a photopolymerizable sulfur compound (C).

<Component (X)>

The component (X) is metal oxide nanoparticles.

The term "nanoparticles" denotes particles having a volume average primary particle diameter in nanometer order (less than 1000 nm). The metal oxide nanoparticles denote metal oxide particles having an average primary particle diameter in nanometer order.

The volume average primary particle diameter of the component (X) is preferably 100 nm or less. The volume average primary particle diameter of the component (X) is preferably in a range of 0.1 to 100 nm, more preferably in a range of 1 to 60 nm, still more preferably in a range of 1 to 50 nm, even still more preferably in a range of 1 to 45 nm, and particularly preferably in a range of 1 to 40 nm. The volume average primary particle diameter of the component (X) is still more preferably 5 to 30 nm, 5 to 25 nm, or 5 to 30 nm. The metal oxide nanoparticles are satisfactorily dispersed in the photocurable composition by setting the volume average primary particle diameter of the metal nanoparticles of the component (X) to be in the above-described preferable ranges. In addition, the refractive index is enhanced. The volume average primary particle diameter is a value measured by a dynamic light scattering method.

Commercially available metal oxide nanoparticles can be used as the component (X). Examples of the metal oxide include oxide particles such as titanium (Ti), zirconium (Zr), aluminum (Al), silicon (Si), zinc (Zn), and magnesium (Mg). Among these, from the viewpoint of the refractive index, titania ($TiO_2$) nanoparticles or zirconia ($ZrO_2$) nanoparticles are preferable as the component (X).

In the present embodiment, commercially available products of metal oxide nanoparticles can be used as the component (X).

Examples of the commercially available titania nanoparticles include TTO series (TTO-51 (A), TTO-51 (C), and the like, and TTO-S, and TTO-V series (TTO-S-1, TTO-S-2, TTO-V-3, and the like) manufactured by SHIHARA SANGYO KAISHA, LTD., TITANIASOL LDB-014-35 manufactured by ISHIHARA SANGYO KAISHA, LTD., MT series (MT-01, MT-05, MT-100SA, MT-500SA, and the like) manufactured by TAYCA CORPORATION, ELECOM V-9108 manufactured by JGC Catalysts and Chemicals Ltd., and STR-100A-LP manufactured by Sakai Chemical Industry Co., Ltd.

Examples of commercially available zirconia nanoparticles include UEP (manufactured by Daiichi Kisenso Kagaku-Kogyo Co., Ltd.), PCS (manufactured by Nippon Denko Co., Ltd.), JS-01, JS-03, JS-04 (manufactured by Nippon Denko Co., Ltd.), and UEP-100 (manufactured by Daiichi Kisenso Kagaku-Kogyo Co., Ltd.).

In the photocurable composition according to the present embodiment, the component (X) may be used alone or in combination of two or more kinds thereof.

The content of the component (X) in the photocurable composition according to the present embodiment can be set to be in a range of 60 to 99 parts by mass with respect to a total of 100 parts by mass of the component (X) and the component (C) described below. The content of the component (X) in the photocurable composition according to the present embodiment is preferably in a range of 65 to 95 parts by mass, more preferably in a range of 65 to 90 parts by mass, still more preferably in a range of 65 to 80 parts by mass, and particularly preferably in a range of 65 to 75 parts by mass with respect to a total of 100 parts by mass of the component (X) and the component (C) described below.

In a case where the content of the component (X) is greater than or equal to the lower limit of the above-described preferable ranges, the optical properties of the cured film formed by using the photocurable composition are further enhanced. Further, in a case where the content of the component (X) is less than or equal to the upper limit of the above-described preferable range, the filling property of the photocurable composition into the mold is enhanced.

Further, in a case where the photocurable composition according to the present embodiment contains the component (B) described below, the content of the component (X) can be set to be in a range of 10 to 99 parts by mass with respect to a total of 100 parts by mass of the component (X), the component (C) described below, and the component (B) described below. The content of the component (X) in the photocurable composition according to the present embodiment is preferably in a range of 60 to 90 parts by mass, more preferably in a range of 60 to 85 parts by mass, still more preferably in a range of 60 to 80 parts by mass, and particularly preferably in a range of 60 to 75 parts by mass with respect to a total of 100 parts by mass of the component (X) and the component (C) described below.

In a case where the content of the component (X) is greater than or equal to the lower limit of the above-described preferable ranges, the optical properties of the cured film formed by using the photocurable composition are further enhanced. Further, in a case where the content of the component (X) is less than or equal to the upper limit of the above-described preferable range, the filling property of the photocurable composition into the mold is enhanced.

<Component (C)>

The component (C) is a photopolymerizable sulfur compound. The term "photopolymerizable sulfur compound" denotes a photopolymerizable monomer having a sulfur atom in a molecule. That is, the photopolymerizable sulfur compound is a monomer having a sulfur atom and a polymerizable functional group.

Examples of the component (C) include a compound having a diaryl sulfide skeleton (hereinafter, also referred to as "component (C1)"). Examples of the component (C1) include a compound represented by General Formula (c-1).

(c-1)

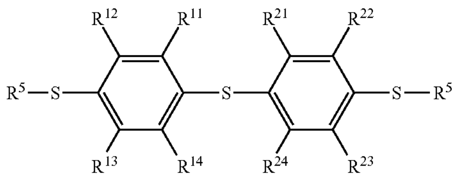

[In the formula, $R^{11}$ to $R^{14}$ and $R^{21}$ to $R^{24}$ each independently represent a hydrogen atom, an alkyl group, or a halogen atom, and $R^5$ represents a polymerizable functional group.]

In Formula (c-1), $R^{11}$ to $R^{14}$ and $R^{21}$ to $R^{24}$ each independently represent a hydrogen atom, an alkyl group, or a halogen atom.

The number of carbon atoms in the alkyl group is preferably in a range of 1 to 10, more preferably in a range of 1 to 6, still more preferably in a range of 1 to 4, and particularly preferably 1 to 3.

The alkyl group may be linear, branched, or cyclic. It is preferable that the alkyl group is linear or branched.

Examples of the linear alkyl group include a methyl group, an ethyl group, an n-propyl group, and an n-butyl group.

Examples of the branched alkyl group include an isopropyl group, a sec-butyl group, and a tert-butyl group.

Among these, as the alkyl group, a methyl group or an ethyl group is preferable, and a methyl group is more preferable.

Examples of the halogen atom as $R^{11}$ to $R^{14}$ and $R^{21}$ to $R^{24}$ include a fluorine atom, a chlorine atom, a bromine atom, and an iodine atom. Among these, a chlorine atom is particularly preferable as the halogen atom.

$R^{11}$ to $R^{14}$ and $R^{21}$ to $R^{24}$ represent preferably a hydrogen atom or an alkyl group, more preferably a hydrogen atom, a methyl group, or an ethyl group, and still more preferably a hydrogen atom.

In Formula (c-1), $R^5$ represents a polymerizable functional group.

Examples of the polymerizable functional group are the same as those exemplary examples above. Among these, a vinyl group, an allyl group, an acryloyl group, or a methacryloyl group is preferable, and an acryloyl group or a methacryloyl group is more preferable as the polymerizable group.

It is preferable that $R^5$ represents an acryloyl group or a methacryloyl group.

Examples of the component (C) include bis(4-methacryloylthiophenyl) sulfide and bis(4-acryloylthiophenyl) sulfide. Among these, bis(4-methacryloylthiophenyl) sulfide is preferable as the component (C).

In the photocurable composition of the embodiment, the component (C) may be used alone or in combination of two or more kinds thereof.

The content of the component (C) can be set to be in a range of 1 to 40 parts by mass with respect to a total of 100 parts by mass of the component (X) and the component (C). The content of the component (C) is preferably in a range of 1 to 35 parts by mass, more preferably in a range of 5 to 35 parts by mass, still more preferably in a range of 10 to 35 parts by mass, even still more preferably in a range of 20 to 35 parts by mass, and particularly preferably in a range of 25 to 35 parts by mass with respect to a total of 100 parts by mass of the component (X) and the component (C).

In a case where the content of the component (C) is greater than or equal to the lower limit of the above-described preferable ranges, the refractive index of the cured film formed by using the photocurable composition is further improved. Further, in a case where the content of the component (C) is less than or equal to the upper limit of the above-described preferable ranges, the dispersibility of the component (X) in the photocurable composition is enhanced.

Further, in a case where the photocurable composition according to the present embodiment contains the component (B) described below, the content of the component (C) is preferably in a range of 1 to 40 parts by mass, more preferably in a range of 3 to 30 parts by mass, still more preferably in a range of 5 to 25 parts by mass, even still more preferably in a range of 5 to 20 parts by mass, and particularly preferably in a range of 5 to 15 parts by mass with respect to a total of 100 parts by mass of the component (X), the component (C), and the component (B).

In a case where the content of the component (C) is greater than or equal to the lower limit of the above-described preferable ranges, the refractive index of the cured film formed by using the photocurable composition is further improved. Further, in a case where the content of the component (C) is less than or equal to the upper limit of the above-described preferable ranges, the dispersibility of the component (X) in the photocurable composition is enhanced.

<Optional Components>

The photocurable composition according to the present embodiment may contain other components in addition to the component (X) and the component (C). Examples of the optional components include a photopolymerizable monomer (component (B)) containing a polymerizable functional group other than the component (C), a photopolymerization initiator (component (D)), a solvent (component (S)), and additives having miscibility (such as a deterioration inhibitor, a release agent, a diluent, an antioxidant, a heat stabilizer, a flame retardant, a plasticizer, a surfactant, and other additives for improving the properties of a cured film).

<Component (B)>

The component (B) is a photopolymerizable monomer containing a polymerizable functional group other than the component (C).

The "polymerizable functional group" is a group which is capable of polymerizing compounds through radical polymerization or the like and has multiple bonds between carbon atoms such as an ethylenic double bond.

In a case where the photocurable composition according to the present embodiment contains the component (B), the crosslinking properties are improved, and properties such as heat resistance are likely to be improved.

Examples of the polymerizable functional group include a vinyl group, an allyl group, an acryloyl group, a methacryloyl group, a fluorovinyl group, a difluorovinyl group, a trifluorovinyl group, a difluorotrifluoromethylvinyl group, a trifluoroallyl group, a perfluoroallyl group, a trifluoromethylacryloyl group, a nonylfluorobutylacryloyl group, a vinyl ether group, a fluorine-containing vinyl ether group, an allyl ether group, a fluorine-containing allyl ether group, a styryl group, a vinylnaphthyl group, a fluorine-containing styryl group, a fluorine-containing vinylnaphthyl group, a norbornyl group, a fluorine-containing norbornyl group, and a silyl group. Among these, a vinyl group, an allyl group, an acryloyl group, or a methacryloyl group is preferable, and an acryloyl group or a methacryloyl group is more preferable.

Examples of the photopolymerizable monomer (monofunctional monomer) containing one polymerizable functional group include a (meth)acrylate having an aliphatic polycyclic structure (hereinafter, referred to as a "component (B1)") such as isobornyl (meth)acrylate, 1-adamantyl (meth)acrylate, 2-methyl-2-adamantyl (meth)acrylate, 2-ethyl-2-adamantyl (meth)acrylate, bornyl (meth)acrylate, or tricyclodecanyl (meth)acrylate; a (meth)acrylate having an aliphatic monocyclic structure such as dicyclopentanyl (meth)acrylate, dicyclopentenyl (meth)acrylate, cyclohexyl (meth)acrylate, 4-butyl cyclohexyl (meth)acrylate, or acryloylmorpholin; a (meth)acrylate having a chain structure such as 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, amyl (meth) acrylate, isobutyl (meth)acrylate, t-butyl (meth)acrylate, pentyl (meth)acrylate, isoamyl (meth)acrylate, hexyl (meth) acrylate, heptyl (meth)acrylate, octyl (meth)acrylate, isooctyl (meth)acrylate, 2-ethylhexyl (meth)acrylate, nonyl (meth)acrylate, decyl (meth)acrylate, isodecyl (meth)acrylate, undecyl (meth)acrylate, dodecyl (meth)acrylate, lauryl (meth)acrylate, stearyl (meth)acrylate, or isostearyl (meth) acrylate; a (meth)acrylate having an aromatic ring structure (hereinafter, referred to as a component (B2)") such as benzyl (meth)acrylate, phenoxyethyl (meth)acrylate, phenoxy-2-methylethyl (meth)acrylate, phenoxyethoxyethyl (meth)acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, EO-modified p-cumylphenol (meth)acrylate, 2-bromophenoxyethyl (meth)acrylate, 2,4-dibromophenoxyethyl (meth)acrylate, 2,4,6-tribromophenoxyethyl (meth)acrylate, EO-modified phenoxy (meth)acrylate, PO-modified phenoxy (meth)acrylate, or polyoxyethylene nonylphenyl ether (meth)acrylate; tetrahydrofurfuryl (meth) acrylate, butoxyethyl (meth)acrylate, ethoxydiethylene glycol (meth)acrylate, polyethylene glycol mono(meth) acrylate, polypropylene glycol mono(meth)acrylate, methoxyethylene glycol(meth)acrylate, ethoxyethyl (meth) acrylate, methoxypolyethylene glycol (meth)acrylate, methoxypolypropylene glycol (meth)acrylate; diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide; and an one-terminal methacrylsiloxane monomer.

Examples of the commercially available product of the monofunctional monomer include ARONIX M101, M102, M110, M111, M113, M117, M5700, TO-1317, M120, M150, and M156 (all manufactured by Toagosei Co., Ltd.); MEDOL10, MIBDOL10, CHDOL10, MMDOL30, MEDOL30, MIBDOL30, CHDOL30, LA, IBXA, 2-MTA, HPA, VISCOAT #150, #155, #158, #190, #192, #193, #220, #2000, #2100, and #2150 (all manufactured by Osaka Organic Chemical Industry Ltd.); light acrylate BO-A, EC-A, DMP-A, THF-A, HOP-A, HOA-MPE, HOA-MPL, HOA (N), PO-A, P-200A, NP-4EA, NP-BEA, IB-XA, and Epoxy Ester M-600A (all manufactured by Kyoeisha Chemical Co., Ltd.); KAYARAD TC110S, R-564, and R-128H (all manufactured by Nippon Kayaku Co., Ltd.); NK ester AMP-10G and AMP-20G (both manufactured by Shin-Nakamura Chemical Industry Co., Ltd.); FA-511A, FA-512A, FA-513A, and FA-BZA (all manufactured by Hitachi Chemical Co., Ltd.); PHE, CEA, PHE-2, PHE-4, BR-31, BR-31M, and BR-32 (all manufactured by DKS Co., Ltd.); VP (manufactured by BASF SE); ACMO, DMAA, and DMAPAA (all manufactured by Kohjin); and X-22-2404 (manufactured by Shin-Etsu Chemical Co., Ltd.).

Examples of the photopolymerizable monomer containing two polymerizable functional group (bifunctional monomer) include trimethylolpropane di(meth)acrylate, ethylene glycol di(meth)acrylate, tetraethylene glycol di(meth)acrylate, polyethylene glycol di(meth)acrylate, polypropylene glycol di(meth)acrylate, 1,4-butanediol di(meth)acrylate, 1,6-hexanediol di(meth)acrylate, neopentyl glycol di(meth) acrylate, and bis(hydroxylmethyl) tricyclodecane di(meth) acrylate.

Examples of the commercially available product of the bifunctional monomer include light acrylates 3EG-A, 4EG-A, 9EG-A, NP-A, DCP-A, BP-4EAL, and BP-4PA (all manufactured by Kyoeisha Chemical Co., Ltd.).

Examples of the photopolymerizable compound containing three or more polymerizable functional groups include a photopolymerizable siloxane compound, a photopolymerizable silsesquioxane compound, and a polyfunctional monomer containing three or more polymerizable functional groups.

Examples of the photopolymerizable siloxane compound include a compound containing an alkoxysilyl group and a polymerizable functional group in a molecule.

Examples of the commercially available product of the photopolymerizable siloxane compound include "KR-513", "X-40-9296", "KR-511", "X-12-1048", and "X-12-1050" (product names, all manufactured by Shin-Etsu Chemical Co., Ltd.).

Examples of the photopolymerizable silsesquioxane compound include a compound which has a main chain skeleton formed of a Si—O bond and is represented by the following chemical formula: $[(RSiO_{3/2})_n]$ (in the formula, R represents an organic group and n represents a natural number).

R represents a monovalent organic group, and examples of the monovalent organic group include a monovalent hydrocarbon group which may have a substituent. Examples of the hydrocarbon group include an aliphatic hydrocarbon group and an aromatic hydrocarbon group. Examples of the aliphatic hydrocarbon group include an alkyl group having 1 to 20 carbon atoms such as a methyl group, an ethyl group, an n-propyl group, an isopropyl group, an n-butyl group, a sec-butyl group, a tert-butyl group, a pentyl group, a hexyl group, a heptyl group, a 2-ethylhexyl group, an octyl group, a nonyl group, a decyl group, an undecyl group, or a dodecyl group. Among these, an alkyl group having 1 to 12 carbon atoms is preferable.

Examples of the aromatic hydrocarbon group include an aromatic hydrocarbon group having 6 to 20 carbon atoms such as a phenyl group, a naphthyl group, a benzyl group, a tolyl group, or a styryl group.

Examples of the substituent that a monovalent hydrocarbon group may have include a (meth)acryloyl group, a hydroxy group, a sulfanyl group, a carboxy group, an isocyanate group, an amino group, and a ureido group. Further, —$CH_2$— contained in the monovalent hydrocarbon group may be replaced with —O—, —S—, a carbonyl group, or the like.

Here, the photopolymerizable silsesquioxane compound contains three or more polymerizable functional groups. Examples of the polymerizable functional group here include a vinyl group, an allyl group, a methacryloyl group, and an acryloyl group.

The compound represented by the chemical formula: $[(RSiO_{3/2})_n]$ may be of a basket type, a ladder type, or a random type. The basket-type silsesquioxane compound may be of a complete basket type or an incomplete basket type in which a part of the basket is open.

Examples of the commercially available product of the photopolymerizable silsesquioxane compound include "MAC-SQ LP-35", "MAC-SQ TM-100", "MAC-SQ SI-20", and "MAC-SQ HDM" (all product names, manufactured by Toagosei Co., Ltd.).

Examples of the polyfunctional monomer containing three or more polymerizable functional groups include a trifunctional monomer such as ethoxylated (3) trimethylolpropane triacrylate, ethoxylated (3) trimethylolpropane trimethacrylate, ethoxylated (6) trimethylolpropane triacrylate, ethoxylated (9) trimethylolpropane triacrylate, ethoxylated (15) trimethylolpropane triacrylate, ethoxylated (20) trimethylolpropane triacrylate, pentaerythritol triacrylate, pentaerythritol trimethacrylate, propoxylated (3) glyceryl triacrylate, propoxylated (3) glyceryl triacrylate, propoxylated (5.5) glyceryl triacrylate, propoxylated (3) trimethylolpropane triacrylate, propoxylated (6) trimethylolpropane triacrylate, trimethylolpropane triacrylate, trimethylolpropane trimethacrylate, tris-(2-hydroxyethyl)-isocyanurate triacrylate, tris-(2-hydroxyethyl)-isocyanurate trimethacrylate, ε-Caprolactone-modified tris-(2-acryloxyethyl) isocyanurate, EO-modified trimethylolpropane tri(meth)acrylate, PO-modified trimethylolpropane tri(meth)acrylate, or EO,PO-modified trimethylolpropane tri(meth)acrylate; a tetrafunctional monomer such as ditrimethylolpropane tetraacrylate, ethoxylated (4) pentaerythritol tetraacrylate, or pentaerythritol tetra(meth)acrylate; and a pentafunctional or higher functional monomer such as dipentaerythritol pentaacrylate or dipentaerythritol hexaacrylate.

Examples of the commercially available product of the polyfunctional monomer include "A-9300-1CL", "AD-TMP", "A-9550", and "A-DPH" (all product names, manufactured by Shin-Nakamura Chemical Industry Co., Ltd.), "KAYARAD DPHA" (product name, manufactured by Nippon Kayaku Co., Ltd.), and "Light Acrylate TMP-A" (product name, manufactured by Kyoeisha Chemical Co., Ltd.).

The content of the component (B) can be set to be in a range of 5 to 80 parts by mass with respect to a total of 100 parts by mass of the component (X), the component (C), and the component (B). The content of the component (B) is preferably in a range of 5 to 40 parts by mass, more preferably in a range of 10 to 35 parts by mass, still more preferably in a range of 10 to 30 parts by mass, and particularly preferably in a range of 10 to 25 parts by mass with respect to a total of 100 parts by mass of the component (X) and the component (B).

In a case where the content of the component (B) is greater than or equal to the lower limit of the above-described preferable range, the curability and fluidity of the cured resin film formed of the photocurable composition are improved. Further, in a case where the content of the component (B) is less than or equal to the upper limit of the above-described preferable ranges, the dispersibility of the component (X) in the photocurable composition is enhanced.

<(D) Component>

The component (D) is a photopolymerization initiator.

As the component (D), a compound that initiates polymerization of the component (B) upon exposure or promotes the polymerization is used. A photoradical polymerization initiator is preferable as the component (D).

Examples of the component (D) include 1-hydroxycyclohexylphenyl ketone, 2-hydroxy-2-methyl-1-phenyl propan-1-on e, 1-[4-(2-hydroxy ethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 2,2-dimethoxy-1,2-diphenyl ethan-1-one, bis(4-dimethylaminophenyl)ketone, 2-methyl-1-(4-methylthiophenyl)-2-morpholinopropan-1-one, 2-benzyl-2-dimethylamino-1-(4-morpholinophenyl)-butanon-1, ethanone-1-[9-ethyl-6-(2-methylbenzoyl)-9H-carbazol-3-yl]-1-(o-acetyloxime), bis(2,4,6-trimethylbenzoyl)-phenylphosphine oxide, 4-benzoyl-4'-methyldimethylsulfide, 4-dimethylaminobenzoic acid, methyl 4-dimethylaminobenzoate, ethyl 4-dimethylaminobenzoate, butyl 4-dimethylaminobenzoate, 4-dimethylamino-2-ethylhexylbenzoic acid, 4-dimethylamino-2-isoamylbenzoic acid, benzyl-β-methoxyethyl acetal, benzyl dimethyl ketal, 1-phenyl-1,2-propanedion-2-(o-ethoxycarbonyl)oxime, methyl o-benzoyl benzoate, 2,4-diethylthioxanthone, 2-chlorothioxanthone, 2,4-dimethylthioxanthone, 1-chloro-4-propoxythioxanthone, thioxanthene, 2-chlorothioxanthene, 2,4-diethylthioxanthene, 2-methylthioxanthene, 2-isopropylthioxanthene, 2-ethylanthraquinone, octamethyl anthraquinone, 1,2-benzanthraquinone, 2,3-diphenylanthraquinone, azobisisobutyronitrile, benzoyl peroxide, cumeme peroxide, 2-mercaptobenzoimidal, 2-mercaptobenzoxazole, 2-mercaptobenzothiazole, a 2-(o-chlorophenyl)-4,5-di(m-methoxyphenyl)-imidazolyl dimer, benzophenone, 2-chlorobenzophenone, p,p'-bisdimethylaminobenzophenone, 4,4'-bisdiethylaminobenzophenone, 4,4'-dichlorobenzophenone, 3,3-dimethyl-4-methoxybenzophenone, benzoyl, benzoin, benzoin methyl ether, benzoin ethyl ether, benzoin isopropyl ether, benzoin-n-butyl ether, benzoin isobutyl ether, benzoin butyl ether, acetophenone, 2,2-diethoxyacetophenone, p-dimethylacetophenone, p-dimethylaminopropiophenone, dichloroacetophenone, trichloroacetophenone, p-tert-butylacetophenone, p-dimethylaminoacetophenone, p-tert-butyltrichloroacetophenone, p-tert-butyldichloroacetophenone, α,α-dichloro-4-phenoxyacetophenone, 2,2-dimethoxy-2-phenylacetophenone, thioxanthone, 2-methylthioxanthone, 2-isopropylthioxanthone, dibenzosuberone, pentyl-4-dimethylaminobenzoate, 9-phenylacridine, 1,7-bis-(9-acridinyl)heptane, 1,5-bis-(9-acridinyl)pentane, 1,3-bis-(9-acridinyl)propane, p-methoxytriazine, 2,4,6-tris (trichloromethyl)-s-triazine, 2-methyl-4,6-bis (trichloromethyl)-s-triazine, 2-[2-(5-methylfuran-2-yl) ethenyl]-4,6-bis(trichloromethyl)-s-triazine, 2-[2-(furan-2-yl)ethenyl]-4,6-bis (trichloromethyl)-s-triazine, 2-[2-(4-diethylamino-2-methylphenyl)ethenyl]-4,6-bis (trichloromethyl)-s-triazine, 2-[2-(3,4-dimethoxyphenyl) ethenyl]-4,6-bis(trichloromethyl)-s-triazine, 2-(4-methoxyphenyl)-4,6-bis(trichloromethyl)-s-triazine, 2-(4-ethoxystyryl)-4,6-bis (trichloromethyl)-s-triazine, 2-(4-n-butoxyphenyl)-4,6-bis(trichloromethyl)-s-triazine, 2,4-bis-trichloromethyl-6-(3-bromo-4-methoxy)phenyl-s-triazine, 2,4-bis-trichloromethyl-6-(2-bromo-4-methoxy)phenyl-s-triazine, 2,4-bis-trichloromethyl-6-(3-bromo-4-methoxy) styrylphenyl-s-triazine, 2,4-bis-trichloromethyl-6-(2-bromo-4-methoxy)styrylphenyl-s-triazine; ketone peroxides such as methyl ethyl ketone peroxide, methyl isobutyl ketone peroxide, and cyclohexanone peroxide; diacyl peroxides such as isobutylyl peroxide and bis(3,5,5-trimethylhexanoyl)peroxide; hydroperoxides such as p-menthanehydroperoxide and 1,1,3,3-tetramethylbutylhydroperoxide; dialkyl peroxides such as 2,5-dimethyl-2,5-bis(t-butylperoxy)hexane; peroxy ketals such as 1,1-bis(t-butylperoxy)-3,3,5-trimethylcyclohexane; peroxy esters such as t-butylperoxyneodecanoate and 1,1,3,3-tetramethylperoxyneodecanoate; peroxydicarbonates such as di-n-propyl peroxydicarbonate and diisopropyl peroxydicarbonate; and azo compounds such as azobisisobutyronitrile, 2,2'-azobis(2,4-dimethylvaleronitrile), and 2,2'-azobisisobutyrate.

Among these, 1-hydroxycyclohexylphenyl ketone, 2-methyl-1-(4-methylthiophenyl)-2-morpholinopropan-1-one, 2-benzyl-2-dimethylamino-1-(4-morpholinophenyl)-butanon-1, bis(2,4,6-trimethylbenzoyl)-phenylphosphine oxide, and 2,2-dimethoxy-2-phenylacetophenone are preferable.

As the component (D), a commercially available product can be obtained and used.

Examples of the commercially available product of the component (D) include "IRGACURE 907" (product name, manufactured by BASF SE), "IRGACURE 369" (product name, manufactured by BASF SE), "IRGACURE 819" (product name, manufactured by BASF SE), and "Omnirad 184", "Omnirad 651", "Omnirad 819", and "Omnirad 184" (all product name, manufactured by IGM Resins B. V.).

It is preferable that the component (D) has a small molecular weight. In a case where the molecular weight of the component (D) is small, the haze tends to further decrease. The molecular weight of the component (D) is, for example, preferably 500 or less, more preferably 400 or less, still more preferably 350 or less, and particularly preferably 300 or less. The lower limit of the molecular weight of the component (D) is not particularly limited and may be 100 or greater, 150 or greater, or 200 or greater. The molecular weight of the component (D) can be, for example, set to be in a range of 100 to 500 and is preferably in a range of 150 to 500, more preferably in a range of 150 to 400, still more preferably in a range of 150 to 350, and particularly preferably in a range of 150 to 300.

In the photocurable composition according to the present embodiment, the component (D) may be used alone or in combination of two or more kinds thereof.

The content of the component (D) in the photocurable composition according to the present embodiment is preferably in a range of 1 to 20 parts by mass, more preferably in a range of 2 to 15 parts by mass, and still more preferably in a range of 5 to 15 parts by mass with respect to a total of 100 parts by mass of the component (X), the component (C), and the component (B). In a case where the content of the component (D) is in the above-described preferable ranges, the photocurability is further improved.

<<Solvent: Component (S)>>

The photocurable composition of the embodiment may contain a solvent (component (S)). The component (S) is used to dissolve or disperse and mix the component (X), the component (C), and desired optional components.

Specific examples of the component (S) includes alcohols having a chain structure such as methanol, ethanol, n-propyl alcohol, isopropyl alcohol, n-pentyl alcohol, s-pentyl alcohol, t-pentyl alcohol, isopentyl alcohol, 2-methyl-1-propanol, 2-ethylbutanol, neopentyl alcohol, n-butanol, s-butanol, t-butanol, 1-propanol, n-hexanol, 2-heptanol, 3-heptanol, 2-methyl-1-butanol, 2-methyl-2-butanol, 4-methyl-2-pentanol, 1-butoxy-2-propanol, propylene glycol monopropyl ether, 5-methyl-1-hexanol, 6-methyl-2-heptanol, 1-octanol, 2-octanol, 3-octanol, 4-octanol, 2-ethyl-1-hexanol, and 2-(2-butoxyethoxy) ethanol; alcohols having a cyclic structure such as cyclopentanemethanol, 1-cyclopentylethanol, cyclohexanol, cyclohexanemethanol, cyclohexaneethanol, 1,2,3,6-tetrahydrobenzyl alcohol, exo-norborneol, 2-methylcyclohexanol, cycloheptanol, 3,5-dimethylcyclohexanol, benzyl alcohol, and terpineol; and compounds having an ester bond, such as ethylene glycol monoacetate, diethylene glycol monoacetate, propylene glycol monoacetate, and dipropylene glycol monoacetate; derivatives of polyhydric alcohols of compounds having an ether bond such as monoalkyl ether such as monomethyl ether, monoethyl ether, monopropyl ether, or monobutyl ether or monophenyl ether of polyhydric alcohols or compounds having the ester bond [among these, propylene glycol monomethyl ether acetate (PGMEA) and propylene glycol monomethyl ether (PGME) are preferable].

In the photocurable composition of the embodiment, the component (S) may be used alone or in combination of two or more kinds thereof.

Among these, as the component (S), at least one selected from the group consisting of propylene glycol monomethyl ether acetate (PGMEA) and propylene glycol monomethyl ether (PGME) is preferable.

The amount of the component (S) to be used is not particularly limited and may be appropriately set according to the thickness of the coating film of the photocurable composition. For example, it can be used so that it is about 100 to 500 parts by mass with respect to 100 parts by mass of the total of the component and the component (C).

<<Surfactant: Component (E)>>

The photocurable composition according to the present embodiment may contain a surfactant in order to adjust the coatability and the like.

Examples of the surfactant include a silicone-based surfactant and a fluorine-based surfactant. As the silicone-based surfactant, for example, BYK-077, BYK-085, BYK-300, BYK-301, BYK-302, BYK-306, BYK-307, BYK-310, BYK-320, BYK-322, BYK-323, BYK-325, BYK-330, BYK-331, BYK-333, BYK-335, BYK-341, BYK-344, BYK-345, BYK-346, BYK-348, BYK-354, BYK-355, BYK-356, BYK-358, BYK-361, BYK-370, BYK-371, BYK-375, BYK-380, and BYK-390 (all manufactured by BYK-Chemie GmbH) and the like can be used. As the fluorine-based surfactant, F-114, F-177, F-410, F-411, F-450, F-493, F-494, F-443, F-444, F-445, F-446, F-470, F-471, F-472SF, F-474, F-475, F-477, F-478, F-479, F-480SF, F-482, F-483, F-484, F-486, F-487, F-172D, MCF-350SF, TF-1025SF, TF-1117SF, TF-1026SF, TF-1128, TF-1127, TF-1129, TF-1126, TF-1130, TF-1116SF, TF-1131, TF-1132, TF-1027SF, TF-1441, and TF-1442 (all manufactured by DIC Corporation), and PolyFox Series PF-636, PF-6320, PF-656, and PF-6520 (all manufactured by Omnova Solutions Inc.) and the like can be used.

In the photocurable composition according to the present embodiment, the surfactant may be used alone or in combination of two or more kinds thereof.

In a case where the photocurable composition according to the present embodiment contains a surfactant, the content of the surfactant is preferably in a range of 0.01 to 3 parts by mass, more preferably in a range of 0.02 to 1 part by mass, and still more preferably in a range of 0.03 to 0.5 parts by mass with respect to a total of 100 parts by mass of the component (X) and the component (B).

In a case where the content of the surfactant is in the above-described preferable ranges, the coatability of the photocurable composition is enhanced.

The cured film formed of the photocurable composition typically has a refractive index of 1.86 or greater at a wavelength of 530 nm. Since the photocurable composition according to the present embodiment can form a cured film having such a high refractive index as described above while satisfactory pattern transferability is maintained, the composition can be suitably used for applications requiring a high refractive index such as 3D sensors and AR waveguides for AR (augmented reality) glasses. The refractive index of the cured film can be measured by a spectroscopic ellipsometer.

The photocurable composition according to the present embodiment described above contains the component (X) and the component (C). The component (C) contains sulfur. It is assumed that since a carbon-sulfur bond (C—S bond) in the component (C) is polarized, the component (C) functions as a binder for the component (X), and the dispersibility of the component (X) in the photocurable composition is enhanced.

Therefore, according to the photocurable composition of the present embodiment, it is assumed that the optical properties (the high refractive index, the haze, and the like) of the cured resin film formed of the photocurable composition are excellent, and satisfactory pattern transferability can be obtained.

Such a photocurable composition is useful as a material for forming a fine pattern on a substrate according to an imprint technology, and is particularly suitable for photo-imprint lithography. In particular, such a photocurable composition exerts an advantageous effect in applications that require a high refractive index, such as 3D sensors for autonomous driving and AR waveguides for AR (augmented reality) glasses.

Further, the photocurable composition according to the present embodiment is also useful as a material for an antireflection film or the like.

(Pattern Formation Method)

A pattern formation method according to a second aspect of the present invention includes a step of forming a photocurable film on a substrate using the photocurable composition according to the first aspect (hereinafter, referred to as "step (i)"), a step of pressing a mold having an uneven pattern against the photocurable film to transfer the uneven pattern to the photocurable film (hereinafter, also referred to as "step (ii)"), a step of exposing the photocurable film to which the uneven pattern has been transferred while pressing the mold against the photocurable film to form a cured film (hereinafter, also referred to as "step (iii)"), and a step of peeling off the mold from the cured film (hereinafter, also referred to as "step (iv)").

FIGS. 1(A) to 1(D) are schematic step views for describing the embodiment of the pattern formation method.

[Step (i)]

In the step (i), a photocurable film is formed on a substrate using the photocurable composition according to the first aspect described above.

As shown in FIG. 1(A), a substrate 1 is coated with the photocurable composition according to the first aspect described above to form a photocurable film 2. In FIG. 1(A), a mold 3 is disposed above the photocurable film 2.

The substrate 1 can be selected depending on various applications, and examples thereof include a substrate for an electronic component and a substrate on which a predetermined wiring pattern is formed. Specific examples thereof include a substrate made of a metal such as silicon, silicon nitride, copper, chromium, iron, or aluminum; and a glass substrate. Examples of the material of the wiring pattern include copper, aluminum, nickel, and gold.

Further, the shape of the substrate 1 is not particularly limited and may be a plate shape or a roll shape. Further, as the substrate 1, a light-transmitting or non-light-transmitting substrate can be selected depending on the combination with the mold and the like.

Examples of the method of coating the substrate 1 with the photocurable composition include a spin coating method, a spray method, an ink jet method, a roll coating method, and a rotary coating method. Since the photocurable film 2 functions as a mask of the substrate 1 in an etching step which may be subsequently performed, it is preferable that the photocurable film 2 has a uniform film thickness in a case of being applied to the substrate 1. From this viewpoint, the spin coating method is suitable in a case where the substrate 1 is coated with the photocurable composition.

The film thickness of the photocurable film 2 may be appropriately selected depending on the applications thereof, and may be, for example, approximately in a range of 0.05 to 30 μm.

[Step (ii)]

In the step (ii), the mold having an uneven pattern is pressed against the photocurable film to transfer the uneven pattern to the photocurable film.

As shown in FIG. 1(B), the mold 3 having a fine uneven pattern on the surface thereof is pressed against the substrate 1 on which the photocurable film 2 has been formed such that the mold 3 faces the photocurable film 2. In this manner, the photocurable film 2 is deformed according to the uneven structure of the mold 3.

The pressure on the photocurable film 2 during the pressing of the mold 3 is preferably 10 MPa or less, more preferably 5 MPa or less, and particularly preferably 1 MPa or less.

By pressing the mold 3 against the photocurable film 2, the photocurable composition positioned at projection portions of the mold 3 is easily pushed away to the side of recess portions of the mold 3, and thus the uneven structure of the mold 3 is transferred to the photocurable film 2.

The uneven pattern of the mold 3 can be formed according to the desired processing accuracy by, for example, photolithography or an electron beam drawing method.

A light-transmitting mold is preferable as the mold 3. The material of the light-transmitting mold is not particularly limited, but may be any material having predetermined strength and durability. Specific examples thereof include a phototransparent resin film such as glass, quartz, polymethyl methacrylate, or a polycarbonate resin, a transparent metal vapor deposition film, a flexible film such as polydimethylsiloxane, a photocured film, and a metal film.

[Step (iii)]

In the step (iii), the photocurable film to which the uneven pattern has been transferred is exposed while the mold is pressed against the photocurable film to form a cured resin film.

As shown in FIG. 1(C), the photocurable film 2 to which the uneven pattern has been transferred is exposed in a state where the mold 3 is pressed against the photocurable film 2. Specifically, the photocurable film 2 is irradiated with electromagnetic waves such as ultraviolet rays (UV). The photocurable film 2 is cured by exposure in a state where the mold 3 is pressed, and thus a cured film (cured pattern) to which the uneven pattern of the mold 3 has been transferred is formed. Further, the mold 3 in FIG. 1(C) has a transparency to electromagnetic waves.

The light used to cure the photocurable film 2 is not particularly limited, and examples thereof include light or radiation having a wavelength in a region such as high-energy ionizing radiation, near ultraviolet rays, far ultraviolet rays, visible rays, or infrared rays. As the radiation, for example, laser light used in fine processing of semiconductors, such as a microwave, EUV, LED, semiconductor laser light, KrF excimer laser light having a wavelength of 248 nm, or an ArF excimer laser having a wavelength of 193 nm can also be suitably used. As the light, monochrome light may be used, or light having a plurality of different wavelengths (mixed light) may be used.

[Step (iv)]

In the step (iv), the mold is peeled off from the cured film.

As shown in FIG. 1(D), the mold 3 is peeled off from the cured film. In this manner, a pattern 2' (cured pattern) consisting of the cured film to which the uneven pattern has been transferred is patterned on the substrate 1.

In the pattern formation method according to the present embodiment described above, a photocurable composition containing the component (X), the component (T), the component (B), and the component (C) described above is used. Since such a photocurable composition is used, a pattern having a high refractive index and excellent light resistance can be formed.

In the present embodiment, a surface 31 of the mold 3 which is brought into contact with the photocurable film 2 may be coated with a release agent (FIG. 1 (A)). In this manner, the releasability of the mold from the cured film can be improved.

Examples of the release agent here include a silicon-based release agent, a fluorine-based release agent, a polyethylene-based release agent, a polypropylene-based release agent, a paraffin-based release agent, a montan-based release agent, and a carnauba-based release agent. Among these, a fluorine-based release agent is preferable. For example, a commercially available coating type release agent such as OPTOOL DSX (manufactured by Daikin Industries, Ltd.) can be suitably used. The release agent may be used alone or in combination of two or more kinds thereof.

Further, in the present embodiment, an organic substance layer may be provided between the substrate 1 and the photocurable film 2. In this manner, a desired pattern can be easily and reliably formed on the substrate 1 by etching the substrate 1 using the photocurable film 2 and the organic substance layer as a mask. The film thickness of the organic substance layer may be appropriately adjusted according to the depth at which the substrate 1 is processed (etched). Further, the film thickness thereof is preferably in a range of 0.02 to 2.0 μm. As the material of the organic substance layer, a material which has lower etching resistance to an oxygen-based gas than that of the photocurable composition and has a higher etching resistance to a halogen-based gas than that of the substrate 1 is preferable. The method of forming the organic substance layer is not particularly limited, and examples thereof include a sputtering method and a spin coating method.

The pattern formation method according to the second aspect may further include other steps (optional steps) in addition to the steps (i) to (iv).

Examples of the optional steps include an etching step (step (v)) and a cured film (cured pattern) removal step (step (vi)) after the etching treatment.

[Step (v)]

In the step (v), for example, the substrate 1 is etched using the pattern 2' obtained in the above-described steps (i) to (iv) as a mask.

Figure 2:
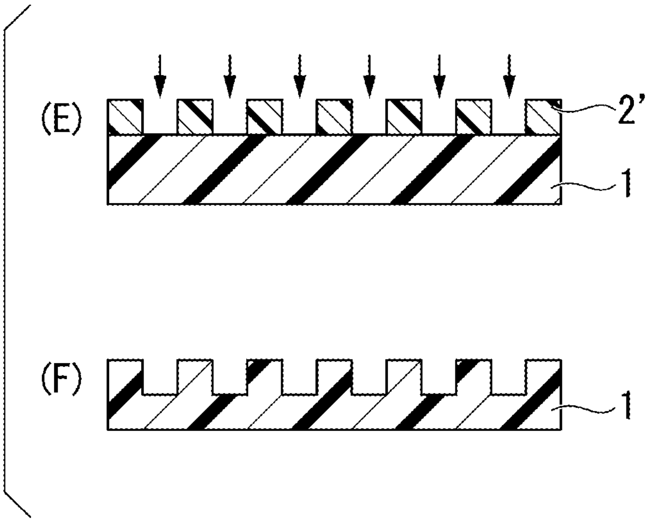
FIGS. 2(E) and 2(F) are schematic step views for describing an example of an optional step.

As shown in FIG. 2 (E), the substrate 1 on which the pattern 2' has been formed is irradiated with at least one of plasma and reactive ions (indicated by arrows) so that the portion of the substrate 1 exposed to the side of the pattern 2' is removed by etching to a predetermined depth.

The plasma or reactive ion gas used in the step (v) is not particularly limited as long as the gas is typically used in the dry etching field.

[Step (vi)]

In the step (vi), the cured film remaining after the etching treatment in the step (v) is removed.

As shown in FIG. 2(F), the step (vi) is a step of removing the cured film (pattern 2') remaining on the substrate 1 after the etching treatment performed on the substrate 1.

The method of removing the cured film (pattern 2') remaining on the substrate 1 is not particularly limited, and examples thereof include a treatment of washing the substrate 1 with a solution in which the cured film is dissolved.

EXAMPLES

Hereinafter, the present invention will be described in more detail with reference to examples, but the present invention is not limited to these examples.

<Preparation of Photocurable Composition>

Each of the photocurable compositions of the examples was prepared by blending each of the components listed in Tables 1 and 2.

TABLE 1

| | Metal oxide nanoparticles Component (X) | Photopolymerizable monomer Component (B) | Photopolymerizable sulfur compound Component (C) | Photopolymerization initiator Component (D) | Surfactant Component (E) | Solvent Component (S) |
|---|---|---|---|---|---|---|
| Example 1 | (X)-1 [70] | — | (C)-1 [30] | (D)-1 [5] | (E)-1 [0.25] | (S)-1 [245] |
| Example 2 | (X)-1 [70] | (B)-1 [15] | (C)-1 [15] | (D)-1 [5] | (E)-1 [0.25] | (S)-1 [245] |
| Example 3 | (X)-2 [60] | — | (C)-1 [40] | (D)-1 [5] | (E)-1 [0.25] | (S)-2 [245] |
| Example 4 | (X)-2 [65] | — | (C)-1 [35] | (D)-1 [5] | (E)-1 [0.25] | (S)-2 [245] |
| Example 5 | (X)-2 [70] | — | (C)-1 [30] | (D)-1 [5] | (E)-1 [0.25] | (S)-2 [245] |
| Example 6 | (X)-2 [65] | (B)-2 [11.7] | (C)-1 [23.3] | (D)-1 [5] | (E)-1 [0.25] | (S)-2 [245] |

TABLE 1-continued

| | Metal oxide nanoparticles Component (X) | Photopolymerizable monomer Component (B) | Photopolymerizable sulfur compound Component (C) | Photopolymerization initiator Component (D) | Surfactant Component (E) | Solvent Component (S) |
|---|---|---|---|---|---|---|
| Example 7 | (X)-2 [70] | (B)-2 [29] | (C)-1 [1] | (D)-1 [5] | (E)-1 [0.25] | (S)-2 [245] |
| Example 8 | (X)-2 [70] | (B)-2 [27] | (C)-1 [3] | (D)-1 [5] | (E)-1 [0.25] | (S)-2 [245] |
| Example 9 | (X)-2 [70] | (B)-2 [25] | (C)-1 [5] | (D)-1 [5] | (E)-1 [0.25] | (S)-2 [245] |
| Example 10 | (X)-2 [70] | (B)-2 [25] | (C)-1 [10] | (D)-1 [5] | (E)-1 [0.25] | (S)-2 [245] |
| Example 11 | (X)-2 [65] | (B)-2 [25] | (C)-1 [10] | (D)-1 [5] | (E)-1 [0.25] | (S)-2 [245] |
| Example 12 | (X)-2 [65] | (B)-2 [23.3] | (C)-1 [11.7] | (D)-1 [5] | (E)-1 [0.25] | (S)-2 [245] |
| Example 13 | (X)-3 [70] | — | (C)-1 [30] | (D)-1 [5] | (E)-1 [0.25] | (S)-2 [245] |

TABLE 2

| | Metal oxide nanoparticles Component (X) | Photopolymerizable monomer Component (B) | Photopolymerizable aromatic compound Component (Z) | Photopolymerization initiator Component (D) | Surfactant Component (E) | Solvent Component (S) |
|---|---|---|---|---|---|---|
| Comparative Example 1 | (X)-1 [70] | (B)-1 [30] | — | (D)-1 [5] | (E)-1 [0.25] | (S)-1 [245] |
| Comparative Example 2 | (X)-1 [80] | (B)-1 [20] | — | (D)-1 [5] | (E)-1 [0.25] | (S)-1 [245] |
| Comparative Example 3 | (X)-2 [65] | (B)-1 [35] | — | (D)-1 [5] | (E)-1 [0.25] | (S)-2 [245] |
| Comparative Example 4 | (X)-2 [70] | (B)-1 [30] | — | (D)-1 [5] | (E)-1 [0.25] | (S)-2 [245] |
| Comparative Example 5 | (X)-2 [70] | (B)-2 [30] | — | (D)-1 [5] | (E)-1 [0.25] | (S)-2 [245] |
| Comparative Example 6 | (X)-2 [75] | (B)-1 [25] | — | (D)-1 [5] | (E)-1 [0.25] | (S)-2 [245] |
| Comparative Example 7 | (X)-2 [75] | — | (Z)-1 [25] | (D)-1 [5] | (E)-1 [0.25] | (S)-2 [245] |
| Comparative Example 8 | (X)-2 [75] | — | (Z)-2 [25] | (D)-1 [5] | (E)-1 [0.25] | (S)-2 [245] |
| Comparative Example 9 | (X)-2 [70] | — | (Z)- [30] | (D)-1 [5] | (E)-1 [0.25] | (S)-2 [245] |
| Comparative Example 10 | (X)-2 [70] | — | (Z)-2 [30] | (D)-1 [5] | (E)-1 [0.25] | (S)-2 [245] |
| Comparative Example 11 | (X)-2 [70] | (B)-1 [15] | (Z)-1 [15] | (D)-1 [5] | (E)-1 [0.25] | (S)-2 [245] |
| Comparative Example 12 | (X)-2 [70] | (B)-1 [15] | (Z)-2 [15] | (D)-1 [5] | (E)-1 [0.25] | (S)-2 [245] |
| Comparative Example 13 | (X)-3 [70] | — | (Z)-1 [30] | (D)-1 [5] | (E)-1 [0.25] | (S)-2 [245] |
| Comparative Example 14 | (X)-3 [70] | — | (Z)-2 [30] | (D)-1 [5] | (E)-1 [0.25] | (S)-2 [245] |
| Comparative Example 15 | (X)-3 [75] | (B)-1 [25] | — | (D)-1 [5] | (E)-1 [0.25] | (S)-2 [245] |

In Tables 1 and 2, each abbreviation has the following meaning. The numerical values in the brackets are blending amounts (parts by mass).

Component (X) (Metal Oxide Nanoparticles)

(X)-1: titania particles, "NS405" (product name), manufactured by Tayca Corporation, volume average primary particle diameter of 15 nm.

(X)-2: titania particles, "LDB-014-35" (product name), manufactured by Ishihara Sangyo Kaisha, Ltd., volume average primary particle diameter of 15 nm.

(X)-3: zirconia particles, "UEP-100" (product name), manufactured by Daiichi Kisenso Kagaku-Kogyo Co., Ltd., volume average primary particle diameter of 15 nm.

Component (B) (Photopolymerizable Monomer)

(B)-1: polyfunctional acrylate, "KAYARAD DPHA" (product name", manufactured by Nippon Kayaku Co., Ltd.

(B)-2: trimethylolpropane triacrylate, "LIGHT ACRYLATE TMP-A" (product name), manufactured by Kyoeisha Chemical Co., Ltd.

Component (C) (Photopolymerizable Sulfur Compound)

(C)-1: bis(4-methacryloylthiophenyl) sulfide, manufactured by Tokyo Chemical Industry Co., Ltd.

(C)-1

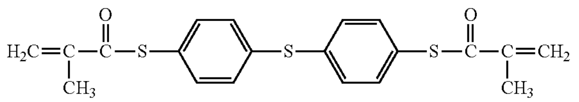

Component (Z) (Photopolymerizable Aromatic Compound)

(Z)-1: bisphenol A type epoxy acrylate, "NK Oligo EA-1010NT2" (product name), manufactured by Shin-Nakamura Chemical Industry Co., Ltd.

(Z)-2: p-phenyl benzyl acrylate, "NK Ester A-BPML" (product name), manufactured by Shin-Nakamura Chemical Industry Co., Ltd.

Component (D) (Photopolymerization Initiator)

(D)-1: 2,2-dimethoxy-2-phenylacetophenone, "Omnirad 651" (product name), manufactured by IGM Resins B. V., molecular weight: 256.3.

Component (E)

(E)-1: "PolyFox PF656" (product name), manufactured by Omnova Solutions Inc., fluorine-based surfactant.

Component (S) (Solvent)

(S)-1: propylene glycol monomethyl ether acetate (PGMEA).

(S)-2: propylene glycol monomethyl ether (PGME).

<Evaluation>

With the photocurable composition of each example, the imprint transferability, the refractive index, and the haze were evaluated by each of the following methods described below. The results are listed in Tables 3 and 4.

[Imprint Transferability]

A silicon substrate was spin-coated with the photocurable composition such that the film thickness reached 600 nm. Next, the composition was prebaked at 100° C. for 1 minute, and a transfer test was performed at a transfer pressure of 0.5 MPa and an exposure amount of 1 J/cm 2 (in a vacuum atmosphere of 200 Pa) for a transfer time of 30 seconds with an imprint device ST-200 (manufactured by Toshiba Machine Co., Ltd.), and the transferability and the filling property of the fine pattern were evaluated based on the following evaluation criteria. A standard film mold LSP70-140 (70 nm Line & Space) (manufactured by Soken Chemical Co., Ltd.) was used as the mold.

Satisfactory: 95% or greater (in a case of confirmation using an SEM, the mold was filled 100% and the pattern was able to be transferred)

Unsatisfactory: Less than 95%

[Refractive Index]

A silicon substrate was spin-coated with the photocurable composition such that the film thickness reached 600 nm. Next, the composition was prebaked at 100° C. for 1 minute and subjected to a photocuring treatment using an imprint device ST-200 (manufactured by Toshiba Machine Co., Ltd.) at an exposure amount of 1 $J/cm^2$ (in a vacuum atmosphere of 200 Pa), thereby obtaining a cured film. The refractive index of the obtained cured film at a wavelength of 530 nm was measured using a spectroscopic ellipsometer M2000 (manufactured by J. A. Woollam Co., Inc.).

TABLE 3

| | Imprint transferability | Refractive index (wavelength of 530 nm) |
|---|---|---|
| Example 1 | Satisfactory | 1.90 |
| Example 2 | Satisfactory | 1.86 |

TABLE 3-continued

| | Imprint transferability | Refractive index (wavelength of 530 nm) |
|---|---|---|
| Example 3 | Satisfactory | 1.89 |
| Example 4 | Satisfactory | 1.91 |
| Example 5 | Satisfactory | 1.94 |
| Example 6 | Satisfactory | 1.88 |
| Example 7 | Satisfactory | 1.86 |
| Example 8 | Satisfactory | 1.87 |
| Example 9 | Satisfactory | 1.87 |
| Example 10 | Satisfactory | 1.90 |
| Example 11 | Satisfactory | 1.86 |
| Example 12 | Satisfactory | 1.87 |
| Example 13 | Satisfactory | 1.87 |

TABLE 4

| | Imprint transferability | Refractive index (wavelength of 530 nm) |
|---|---|---|
| Comparative Example 1 | Satisfactory | 1.76 |
| Comparative Example 2 | Unsatisfactory | 1.81 |
| Comparative Example 3 | Satisfactory | 1.81 |
| Comparative Example 4 | Satisfactory | 1.84 |
| Comparative Example 5 | Satisfactory | 1.85 |
| Comparative Example 6 | Unsatisfactory | 1.89 |
| Comparative Example 7 | Unsatisfactory | 1.91 |
| Comparative Example 8 | Unsatisfactory | 1.9 |
| Comparative Example 9 | Unsatisfactory | 1.86 |
| Comparative Example 10 | Unsatisfactory | 1.86 |
| Comparative Example 11 | Satisfactory | 1.85 |
| Comparative Example 12 | Satisfactory | 1.85 |
| Comparative Example 13 | Unsatisfactory | 1.84 |
| Comparative Example 14 | Unsatisfactory | 1.83 |
| Comparative Example 15 | Unsatisfactory | 1.79 |

As shown in the results listed in Tables 3 and 4, in the photocurable compositions of Examples 1 to 13 to which the invention of the present application was applied, the imprintability was enhanced, the refractive index was 1.86 or greater, and the refractive index was high. On the contrary, the photocurable compositions of Comparative Examples 1, 3 to 5, 11, and 12 had satisfactory imprintability, but the refractive indices thereof were 1.85 or less. Further, the photocurable compositions of Comparative Examples 2, 6 to 10, and 13 to 15 had a refractive index of 1.86 or greater, but the imprintability was poor.

As shown in the above-described results, it was confirmed that the photocurable composition of the examples had satisfactory imprintability, and a cured resin film having a high refractive index was obtained.

While preferred embodiments of the invention have been described and illustrated above, it should be understood that these are exemplary of the invention and are not to be considered as limiting. Additions, omissions, substitutions, and other modifications can be made without departing from the scope of the invention. The present invention is not limited by the foregoing description, but is limited only by the scope of the appended claims.

REFERENCE SIGNS LIST

1: Substrate

2: Photocurable film

3: Mold

What is claimed is:

1. A photocurable composition comprising:

metal oxide nanoparticles (X);

a photopolymerizable sulfur compound (C); and a solvent (S), wherein the content of the solvent (S) is in a range of 100 to 500 parts by mass with respect to 100 parts by mass of a total content of the metal oxide nanoparticles (X) and the photopolymerizable sulfur compound (C), wherein the composition does not contain a photopolymerizable monomer containing one polymerizable functional group.

2. The photocurable composition according to claim 1 wherein the photopolymerizable sulfur compound (C) component contains a compound (C1) having a diaryl sulfide skeleton.

3. The photocurable composition according to claim 1, wherein the metal oxide nanoparticles (X) have a volume average primary particle diameter of 100 nm or less.

4. The photocurable composition according to claim 1, wherein a content of the photopolymerizable sulfur compound (C) is in a range of 1 to 40 parts by mass with respect to 100 parts by mass of a total content of the metal oxide nanoparticles (X) and the photopolymerizable sulfur compound (C).

5. The photocurable composition according to claim 1, wherein a refractive index of a cured resin film formed of the photocurable composition at a wavelength of 530 nm is 1.86 or greater.

6. The photocurable composition according to claim 1, wherein the photocurable composition is used for photoimprint lithography.

7. A pattern formation method comprising:

forming a photocurable film on a substrate using the photocurable composition according to claim 1;

pressing a mold having an uneven pattern against the photocurable film to transfer the uneven pattern to the photocurable film;

exposing the photocurable film to which the uneven pattern has been transferred while pressing the mold against the photocurable film to form a cured film; and peeling off the mold from the cured film.

8. The photocurable composition according to claim 1, wherein the metal oxide nanoparticles (X) are titania ($TiO_2$) nanoparticles.

* * * * *